Feb. 6, 1934.          W. W. RIEDEL          1,945,566
SHOCK ABSORBER
Filed Oct. 31, 1929
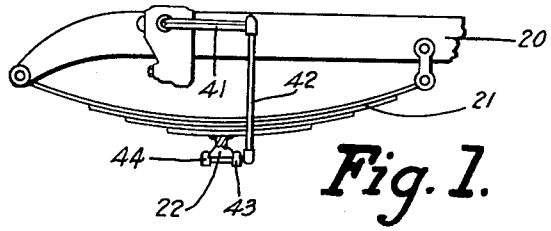
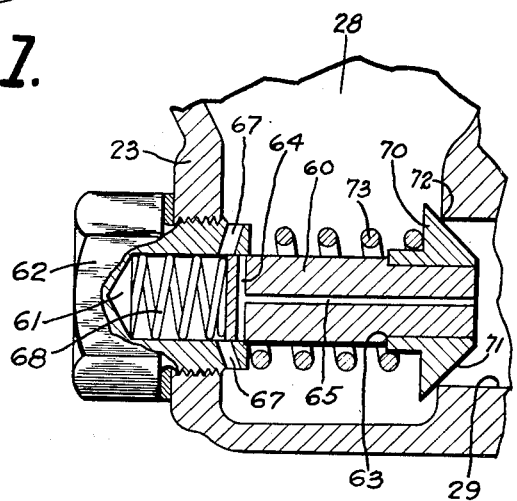
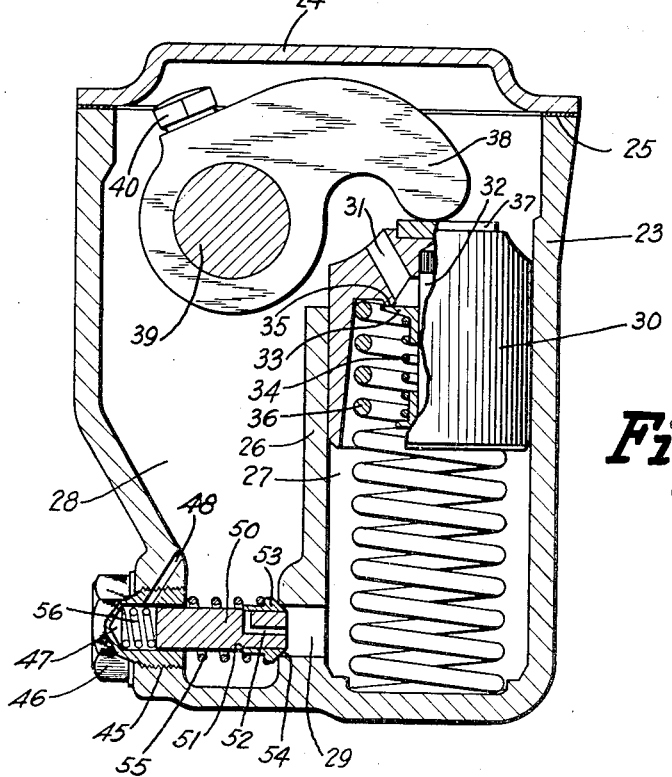
Inventor
Walter W. Riedel
By
Spencer, Hardman & Fehr
Attorneys Patented Feb. 6, 1934

1,945,566

UNITED STATES PATENT OFFICE 1,945,566

SHOCK ABSORBER

Walter W. Riedel, Dayton, Ohio, assignor to Delco Products Corporation, Dayton, Ohio, a corporation of Delaware Application October 31, 1929. Serial No. 403,745

9 Claims. (Cl. 267—8)

This invention relates to improvements in hydraulic shock absorbers adapted to control the rebounding movement of vehicle springs.

It is among the objects of the present invention to provide a hydraulic shock absorber with a compound pressure release valve of simple and compact structure, said valve being adapted successively to establish restricted flows of fluid whereby the rebound movement of the vehicle spring to which said shock absorber is connected is properly controlled.

Further objects and advantages of the present invention will be apparent from the following description, reference being had to the accompanying drawing wherein a preferred embodiment of one form of the present invention is clearly shown.

In the drawing:

Fig. 1 is a fragmentary side view of the front end of a vehicle chassis having a shock absorber embodying the present invention attached thereto.

Fig. 2 is a vertical sectional view taken through the center of the shock absorber.

Fig. 3 is an enlarged, fragmentary sectional view illustrating a modified form of compound pressure release valve.

Referring to the drawing, the numeral 20 designates the frame of the vehicle. This frame has springs 21 secured thereto in any suitable manner, which support the frame upon the usual vehicle axle 22.

The shock absorber comprises a casing 23 having an open end which is sealed and covered by a cap 24 provided with a gasket 25, the cover being secured to the casing in any suitable manner. A partition 26 within the casing cooperates with a portion of the casing wall to provide a cylinder 27 within the casing, the surrounding space within the casing designated by the numeral 28, forming a fluid reservoir. Partition 26 has a port 29 providing communication between the fluid reservoir 28 and the bottom of the cylinder 27.

Within the cylinder 27 there is provided a piston 30, having a passage 31 in the head thereof. The piston head carries a pin 32 which slidably supports the valve 33. A spring 34 yieldably maintains the valve 33 in seating engagement with the annular valve seat 35 provided on the inner surface of the piston head. A spring 36 interposed between the piston 30 and the bottom of the cylinder 27 urges the piston 30 upwardly so that its wear-piece 37, carried in the piston head, is maintained in substantially constant engagement with the rocker arm 38. The rocker arm 38 is supported upon the shaft 39 and secured thereto by a set screw 40. Shaft 39 is journalled in the casing, one end thereof extending outside the casing and having the shock absorber operating arm 41 provided thereon. The free end of arm 41 is swivelly secured to one end of the link rod 42, the other end of said link rod being swivelly secured to a bracket 43 which is anchored to the axle 22 by a clamping member 44.

In the wall of the casing 23 there is provided an aperture 45 having screw threads, said aperture being substantially in coaxial alignment with the port 29. Aperture 45 receives a screw plug 46, the shank portion of which is provided with a recess 47. A passage 48 in the casing wall communicates with a corresponding passage in the shank of the plug 46 to provide communication between the inner end of the recess 47 and the fluid reservoir 28.

A compound fluid pressure release valve is provided for the port 29 said valve comprising a valve stem 50, one end of which fits loosely into the recess 47 of the plug 46. The opposite end of said valve stem 50 has a reduced portion forming an annular shoulder 51. A passage 52 in the valve stem 50 has one end terminating in the end of the valve stem extending into the port 29, the other end of said passage terminating in the reduced diameter portion of the valve stem 50 adjacent the shoulder 51. The compound fluid pressure release valve comprises also a valve head 53, ring-shaped and adapted to fit slidably upon the reduced end of the valve stem 50. As shown in the Fig. 2, the valve head 53 has a frustro-conically shaped end presenting a tapering surface 54 which is adapted to engage a peripheral edge of the port 29. A spring 55 interposed between the valve head 53 and the plug 46 yieldably urges the valve 53 so that its tapering surface 54 engages with the peripheral edge of the port 29 as shown in Fig. 2. A spring 56 of lesser tension than the spring 55 is provided within the recess 47, said spring engaging the end of the valve stem 50, extending into said recess, and urging said valve stem toward the valve head 53 so that the shoulder 51 of said valve stem is normally maintained in engagement with the one end of the valve head 53.

The operation of this device is as follows:

Springs 21 are flexed upwardly toward the frame 20 when the wheels, not shown but mounted on the axle 22 strike an obstacle in the roadway, this movement of the springs resulting in the upward movement of link connection 22 and thus counter-clockwise rotation of the shock absorber operating arm 31, the shaft 39 and its attached rocker arm 38. Under these conditions spring 36 may move the piston 30 upwardly in the cylinder 36 as regards Fig. 2, thus the fluid in the fluid reservoir 28, acting through passage 31, will move valve 33 from engagement with the valve seat 35 to establish a substantially free flow of fluid from the fluid reservoir through passage 31, past valve 33 into the cylinder 27.

The spring 21, having reached the limit of its flexure caused by the particular obstruction being met, will have a tendency to return to normal unflexed position with a sudden, rebounding movement, which, if not checked, will result in undesirable jars and jolts being transmitted to the frame of the vehicle. The present device upon the return of springs 21 will be operated clockwise that is, the shock absorber operating arm 41, together with the shaft 39 and arm 38 will be rotated clockwise, causing the piston 30 to be pushed downwardly into the cylinder 29 as regards Fig. 2, thus a pressure will be exerted upon the fluid within said cylinder. Under pressure, this fluid is discharged from cylinder 27. When said pressure reaches a proper value, the valve stem 50 will first be moved toward the left against the effect of spring 56 to establish a flow through the channel or passage 52 as soon as the one end of said passage is brought from beneath the valve head 53. The valve stem 50 in moving toward the left as regards Fig. 2 will force fluid from the recess 47 through the passage 48 until such passage has been covered by the valve stem 50, at which time any fluid, trapped in the recess 47, will act as a cushioning means tending to resist further movement of the stem 50 toward the left. If the fluid flow through channel or passage 52 is sufficient properly to relieve the pressure, then valve 53 will not be moved from its engagement with the peripheral edge of the port 29. However, if excessive pressure obtains within the cylinder 27, then valve 53 will be moved along the valve stem 50 against the effect of spring 55 to establish the second fluid pressure relieving flow through the port 29.

Fig. 3 illustrates a modified form of pressure release valve. In this structure the valve stem is designated by the numeral 60, said valve stem having its one end fitting loosely into the recess 61 of the plug 62, the other end having a reduced diameter portion presenting the shoulder 63. A cross passage 64, adjacent the end of the stem fitting into the plug 62, is in communication with a longitudinal passage 65, the one end of which terminates at the reduced end of the valve stem 60, or at the end of the valve stem extending into the port 29. Openings 67 are provided in the shank portion of the plug 62 adjacent the end thereof, being so positioned that normally they are not covered by the end of the valve stem 60 extending into the plunger recess. A spring 68 is provided within the recess and engages the end of the stem 60 extending thereinto. The valve head designated by the numeral 70, in the present instance has a frustro-conically shaped portion presenting the tapering surface 71 which is maintained in engagement with the peripheral edge 72 of the port 29 by a spring 73, which is interposed between the valve head 70 and the plug 62 and yieldably urges the valve head to engage the edge of the port 29.

This device functions as follows:

Low fluid pressures, on attaining a proper value, will move the valve stem 60 against the effect of its spring 68 so that cross passage 64 will align with passages 67, and thus will be established a restricted flow from the port 29 through the passages 65 and 64. The movement of the stem 60 toward the left is alone resisted by the spring 68 until the end of said stem has passed beyond the confines of the opening 67 at which time any fluid trapped within the recess 61 will coact with the spring 68 to resist the movement of the stem in this direction. If the fluid pressure in the port 29 raises beyond a predetermined value, valve head 70 will be moved upon the valve stem 60 against the effect of the spring 73 so that the sloping surface 71 of said valve head will be disengaged from the annular edge 72 of the port 29, and thus will be established an additional fluid relieving flow from the port 29.

The present invention provides a compound valve of simple and compact structure, capable of establishing fluid relieving flows from the cylinder of the shock absorber successively in response to varying pressures.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a fluid reservoir and a cylinder; a piston in said cylinder forming a compression chamber therein; a port providing communication between said chamber and reservoir; and a compound fluid pressure release valve for said port comprising a ring-shaped valve-head adapted to engage the peripheral edge of the port; a spring yieldably urging said valve-head to engage the edge of the port, a valve-stem having a reduced end portion upon which the valve-head slidably fits, said stem having a passage one end of which opens into the port the other terminating in the side of the stem so as normally to be covered by the valve head; and a spring of lesser tension of the aforementioned spring urging the valve-stem toward the valve-head normally to maintain the one end of the passage in said stem beneath the valve-head.

2. A shock absorber comprising in combination, a casing presenting a fluid reservoir and a cylinder; a piston in said cylinder forming a compression chamber therein; a port providing communication between said chamber and reservoir; a recessed plug in the casing, and a compound valve for the port, said valve comprising a valve-stem one end of which fits loosely the recess of the plug, the other end of the stem having a reduced diameter portion presenting an annular shoulder, this end of the stem having a passage one end of which terminates in the end of the stem the other in the side of the smaller diameter end portion of the stem; a ring-shaped valve-head fitting slidably upon the smaller end of the stem one end of said valve normally engaging the shoulder on the stem the other side the peripheral edge of the port, a spring in the recess of the plug urging the valve-stem so that its shoulder engages the valve-head and the one end of the passage in said stem is closed by said valve-head, and a spring stiffer than the aforementioned spring, interposed between the plug and valve-head yieldably urging the valve head to engage the edge of the port to close said port.

3. A shock absorber comprising, in combination, a casing providing a fluid reservoir and a cylinder; a piston in the cylinder forming a compression chamber therein said chamber having an outlet port; a piston operating member; a fluid flow control device normally closing the outlet port and having two relatively movable elements operable successively, in response to predetermined fluid pressures, to establish flows of fluid from the compression chamber, the one device first establishing a flow and then substantially shutting off the flow before a fluid flow is established by the second device.

4. A shock absorber comprising, in combination, a casing providing a fluid reservoir and a cylinder and a port connecting said reservoir and cylinder; a piston for forcing fluid from the cylinder through the port into the reservoir; and a compound fluid flow control device for said port normally completely closing the port and adapted, in response to fluid pressure, successively to establish restricted flows of fluid through said port, said device comprising an orificed valve stem movable by a predetermined fluid pressure to establish an initial flow of fluid through the port, a spring yieldingly resisting movement of said valve stem; a dash-pot providing a hydraulic bumper adapted to arrest movement of said stem at a predetermined point in its travel, a pop-off valve slidably carried by the stem and movable by a pressure exceeding aforesaid predetermined pressure to establish a second flow of fluid through said port; and a spring around the stem and engaging said pop-off valve, yieldingly urging it to close said port.

5. A shock absorber having a cylinder and a piston in said cylinder forming a compression chamber; an outlet duct for said chamber; and a compound fluid flow control device normally closing said outlet duct and adapted successively to establish flows of fluid through said duct, said device comprising cooperating valve stem and valve head portions, one of which is adapted to be moved by fluid pressure relatively to the other to establish one restricted fluid flow through said duct and then substantially discontinue the flow established thereby, after which the other portion is adapted to be moved by fluid pressure to establish another restricted flow through the duct.

6. A shock absorber having a cylinder in which a piston forms a fluid chamber; an outlet port for said chamber; and a compound fluid flow control device adapted normally to close said port, but successively to establish different restricted flows of fluid through said port, said device comprising cooperating valve stem and valve head portions, one of which is adapted to be moved by a predetermined fluid pressure first to establish a restricted flow of fluid through the port and at a comparatively higher fluid pressure completely to shut off said flow, after which the other portion is adapted, in response to a still higher fluid pressure, to establish another flow through said port; and separate springs yieldably urging said portions into normal positions.

7. A shock absorber having a cylinder in which a piston forms a fluid chamber; an outlet duct in said chamber; a compound valve mechanism normally closing said duct and adapted to establish differently restricted flows of fluid through said duct in response to different fluid pressures within said chamber, said valve mechanism comprising a valve stem and valve head portion, one supported upon the other, the valve stem portion being adapted to establish, then to completely shut off a flow of fluid through said duct before the valve head portion establishes a flow therethrough; and separate springs yieldably urging said valve portions into normal duct-closing positions, one spring exerting a lesser pressure than the other.

8. A shock absorber in accordance with claim 6 in which, however, the spring engaging the valve stem exerts a lesser pressure upon said valve stem to urge it into normal position than the spring which engages the valve head and urging it into normal position.

9. A shock absorber having a cylinder in which a piston forms a fluid chamber; an outlet duct for said chamber; a compound valve mechanism normally closing said duct and comprising valve stem and valve head portions, the latter supported upon the former, the valve stem portion being adapted to be actuated relatively to the valve head at a predetermined fluid pressure for establishing a restricted flow of fluid from the chamber, and at a higher pressure to be actuated completely to shut off said flow, the valve head being adapted to be moved relatively to the valve stem in response to still higher pressures and only after the valve stem has shut off the flow of fluid established by it, for establishing another restricted flow of fluid from said chamber through the duct; and springs yieldably urging said valve stem and valve head into normal positions, one spring exerting a greater pressure than the other.

WALTER W. RIEDEL.